R. S. WILBUR.
TESTING SYSTEM.
APPLICATION FILED JULY 6, 1914.
1,219,517.
Patented Mar. 20, 1917.
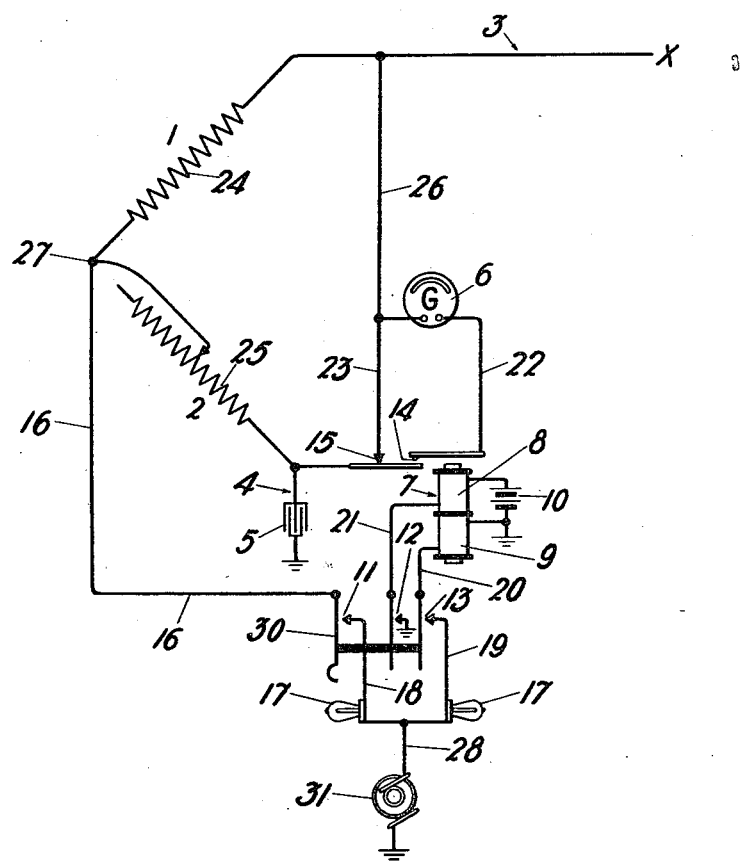
Witnesses:
O. E. Rasmussen
O. D. M. Guthe
Inventor:
Ray S. Wilbur.
by L. T. Tanner
Att'y.

UNITED STATES PATENT OFFICE.

RAY SETH WILBUR, OF JERSEY CITY, NEW JERSEY, ASSIGNOR, BY MESNE ASSIGNMENTS, TO WESTERN ELECTRIC COMPANY, INCORPORATED, A CORPORATION OF NEW YORK.

TESTING SYSTEM.

1,219,517.    Specification of Letters Patent.    Patented Mar. 20, 1917.

Application filed July 6, 1914. Serial No. 849,262.

*To all whom it may concern:*

Be it known that I, RAY SETH WILBUR, a citizen of the United States, residing at Jersey City, in the county of Hudson and State of New Jersey, have invented certain new and useful Improvements in Testing Systems, of which the following is a full, clear, concise and exact description.

This invention relates to testing systems. Its object is to measure the constants of electric circuits, and particularly to measure the capacity of line wires so as to determine the approximate location of faults therein.

In accordance with this invention, a source of alternating current is applied to the circuit or line to be tested and a current detector is introduced into the testing circuit during one-half of each cycle. A preferred testing system which embodies the invention consists of a Wheatstone bridge having a condenser of known capacity in one arm thereof, and the line to be tested, which is in effect a condenser of unknown capacity, in the other arm thereof, means for connecting a source of alternating current to said bridge for charging said condensers, and means for connecting a measuring instrument or current detector during one-half of each cycle to the points across the bridge to which the condensers are connected.

The accompanying drawing is a circuit diagram showing apparatus wired in accordance with this invention.

In an arm 1 of a Wheatstone bridge there is placed a constant resistance 24, while in another arm 2 a variable resistance 25 is inserted. A condenser 5 of known capacity is placed in arm 4, and a condenser X of unknown capacity, such as a line, which is in effect a condenser whose capacity is unknown, is placed in arm 3. A galvanometer 6, which is normally in an open circuit, is arranged to be connected across the bridge by the opening of contact 15 and the closing of contact 14, through the agency of an electromagnetic device 7. The electromagnetic device 7 consists of a polarized relay having two windings 8 and 9. One side of the winding 8 is connected to grounded battery 10, while the other side is connected to ground through the closing of contact 12. The winding 9 is connected to ground on one side, while the other side is connected to a grounded source 31 of alternating current by the closing of contact 13. Contacts 11, 12 and 13 are controlled by a switch 30. The generator 31 is protected from injury which might result from shorts, etc., by inserting lamps 17, 17 in the generator circuit.

The operation of the system is as follows: When a conductor X, such as a telephone aerial line, is broken open, and it is desired to determine the approximate location of the break, the line is connected to the arm 3 of the Wheatstone bridge. By actuating switch 30 an alternating current from generator 31 is impressed upon conductor 16, said current dividing at point 27 of the Wheatstone bridge. The path of this current may be traced as follows: from grounded generator 31, conductor 28, lamp 17, conductor 18, contact 11, conductor 16, the current dividing at point 27, part of which flows through the constant resistance 24 inserted in arm 1, passing to arm 3, which has connected thereto the condenser of unknown capacity or line wire X. The other part of the current passes through the variable resistance 25 of arm 2, through the condenser 5 of known capacity, to ground. By this means both the condensers of known and unknown capacity are charged. Through the closure of contact 12, winding 8 of the relay 7 is energized, but the strength of the current flowing through this winding is not sufficient to operate said relay. The winding 9 is energized by the current from the generator 31 flowing through conductor 28, lamp 17, conductor 19, contact 13, winding 9, to ground. Since relay 7 is of a polarized type, the current from generator 31 will only aid in operating said relay when the current from both of the sources 10 and 31 flows in the same direction. It follows that relay 7 will only be operated upon every one-half cycle of the current furnished by the source 31.

The actuation of relay 7 closes contact 14 and opens contact 15, thus allowing the galvanometer 6 to be bridged across the charging circuit. Consequently the galvanometer is cut in on the peak of the charging current during one-half of each cycle. The discharge of the condensers takes place through the resistances 24 and 25 back through the generator 31. By changing the variable resistance 25, the discharge of the known condenser 5 and the unknown condenser X may be balanced against each other, so that when the galvanometer 6 is bridged across the circuit a point is reached when no deflection of the needle takes place. By proportioning the resistances 24, 25 to the condenser capacities 5, X, and interpolating the result by any of the well-known methods, the approximate distance from the point where the test is made to the place where the conductor is broken open can easily be determined.

By delivering half-waves to the measuring instrument or current detector when said instrument is introduced into the testing circuit, the needle or indicator thereof will be deflected only in one direction. Because of this fact, it is possible to obtain accurate results in a testing system which embodies a comparatively simple testing circuit.

What is claimed is:

1. A testing system comprising a Wheatstone bridge, a condenser of known capacity in one arm thereof, a condenser of unknown capacity in another arm thereof, sources of alternating and direct current, a switch, a measuring instrument, and a relay for connecting said measuring instrument to said bridge, said relay having a plurality of windings, one of said windings being connected to said source of direct current and another of said windings being connected to said source of alternating current upon the actuation of said switch, thereby permitting said relay to be operated when the flow of current from both of said sources is in the same direction.

2. A testing system comprising a Wheatstone bridge, a condenser of known capacity in one arm thereof, a condenser of unknown capacity in another arm thereof, sources of alternating and direct current, a measuring instrument, and a relay for connecting said measuring instrument to said bridge, said relay having a plurality of windings, one of said windings being connected to said source of direct current and another of said windings being connected to said source of alternating current, thereby permitting said relay to be operated when the flow of current from both said sources is in the same direction.

3. A testing system comprising a Wheatstone bridge, a condenser of known capacity in one arm thereof, a condenser of unknown capacity in another arm thereof, a source of alternating current, a measuring instrument, and a polarized electromagnetic switching device operated by current from said source during each alternate half cycle to connect the measuring instrument to the bridge and in circuit with said source of current.

In witness whereof, I hereunto subscribe my name this 2nd day of July A. D., 1914.

RAY SETH WILBUR.

Witnesses:
NANAN E. TUTHILL,
K. L. STAHL.